(12) United States Patent
Sugahara et al.

(10) Patent No.: US 12,350,871 B2
(45) Date of Patent: Jul. 8, 2025

(54) INJECTION MOLDING MACHINE

(71) Applicant: FANUC CORPORATION, Yamanashi (JP)

(72) Inventors: Keisuke Sugahara, Yamanashi-ken (JP); Hiroaki Kirihata, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 321 days.

(21) Appl. No.: 17/926,527

(22) PCT Filed: May 24, 2021

(86) PCT No.: PCT/JP2021/019488
§ 371 (c)(1),
(2) Date: Nov. 18, 2022

(87) PCT Pub. No.: WO2021/241464
PCT Pub. Date: Dec. 2, 2021

(65) Prior Publication Data
US 2023/0191673 A1   Jun. 22, 2023

(30) Foreign Application Priority Data

May 28, 2020 (JP) .................................. 2020-093311

(51) Int. Cl.
  *B29C 45/17* (2006.01)
  *B29C 45/07* (2006.01)
  *B29C 45/20* (2006.01)
(52) U.S. Cl.
  CPC .......... *B29C 45/1777* (2013.01); *B29C 45/07* (2013.01); *B29C 45/1761* (2013.01);
  (Continued)

(58) Field of Classification Search
  CPC ..... B28C 45/07; B28C 45/1775; B28C 45/20; B22D 17/203; B22D 17/2015
  See application file for complete search history.

(56) References Cited

U.S. PATENT DOCUMENTS 3,887,312 A   6/1975  Seary
4,386,903 A   6/1983  Wybenga
(Continued)

FOREIGN PATENT DOCUMENTS

DE   10337785 B3   11/2004
JP   H081062 Y2    1/1996
(Continued)

OTHER PUBLICATIONS

International Search Report issued by the Japanese Patent Office acting as the International Searching Authority in relation to International Application No. PCT/JP2021/019488 dated Jun. 22, 2021 (3 pages) along with English language translation (3 pages).

(Continued)

*Primary Examiner* — Susan D Leong
*Assistant Examiner* — Xinwen Ye
(74) *Attorney, Agent, or Firm* — Robert P. Michal, Esq.; Carter, DeLuca & Farrell LLP

(57) ABSTRACT

An injection molding machine includes a connection member that connects a nozzle touch mechanism and a fixed platen. The connection member has: an arm part that rises upward from a support frame part on a side of the fixed platen; and a platen connection part that is provided on an upper section of the arm part and serves as a second connection section connected to the fixed platen. The platen connection part has: a connection pin that is fixed to the arm part and extends in a left-right direction coinciding with the width direction of a machine frame; and a rotary member that is fixed to the fixed platen and can rotate around the (Continued)

connection pin, wherein the connection pin is disposed so as to pass through the center axis of a nozzle and include a plane parallel to a mount surface of the machine frame.

12 Claims, 10 Drawing Sheets

(52) U.S. Cl.
CPC ...... *B29C 45/1775* (2013.01); *B29C 45/1781* (2013.01); *B29C 2045/1767* (2013.01); *B29C 2045/1778* (2013.01); *B29C 45/20* (2013.01)

(56) References Cited

U.S. PATENT DOCUMENTS

| | | | |
|---|---|---|---|
| 4,540,359 | A | 9/1985 | Yamazaki |
| 5,044,927 | A | 9/1991 | DiSimone et al. |
| 5,804,224 | A | 9/1998 | Inaba et al. |
| 6,039,559 | A | 3/2000 | Eppich |
| 6,425,753 | B1 | 7/2002 | Eppich |
| 6,524,095 | B1 * | 2/2003 | Ito ................... B29C 45/1777 425/574 |
| 2002/0132026 | A1 | 9/2002 | Maurilio |
| 2002/0168443 | A1 | 11/2002 | Bauer |
| 2003/0025247 | A1 | 2/2003 | Schaffer et al. |
| 2003/0168198 | A1 | 9/2003 | Pollak et al. |
| 2005/0008731 | A1 | 1/2005 | Okazaki |
| 2005/0053686 | A1 | 3/2005 | Nagaya et al. |
| 2005/0084556 | A1 | 4/2005 | Yoshioka et al. |
| 2006/0127528 | A1 | 6/2006 | Schmidt et al. |
| 2007/0087080 | A1 | 4/2007 | Weinmann |
| 2007/0235898 | A1 | 10/2007 | Spicer et al. |
| 2008/0088048 | A1 | 4/2008 | Hayakawa et al. |
| 2008/0175938 | A1 | 7/2008 | Teng et al. |
| 2009/0011073 | A1 | 1/2009 | Nishimura et al. |
| 2012/0128813 | A1 | 5/2012 | Takemoto et al. |
| 2013/0129858 | A1 | 5/2013 | Fujita et al. |
| 2014/0088757 | A1 | 3/2014 | Inami et al. |
| 2014/0141112 | A1 | 5/2014 | Liu |
| 2014/0161925 | A1 | 6/2014 | Yoshioka |
| 2015/0158222 | A1 | 6/2015 | Kitta et al. |
| 2017/0291342 | A1 | 10/2017 | Dirneder et al. |
| 2017/0326770 | A1 | 11/2017 | Hirose et al. |
| 2017/0355116 | A1 | 12/2017 | Sugahara |
| 2018/0290359 | A1 | 10/2018 | Berlin et al. |
| 2018/0370101 | A1 | 12/2018 | Schad et al. |
| 2019/0030773 | A1 * | 1/2019 | Sugahara ............ B29C 45/1744 |
| 2019/0152103 | A1 | 5/2019 | Inoue et al. |

FOREIGN PATENT DOCUMENTS

| | | | |
|---|---|---|---|
| JP | 2001038764 | A | 2/2001 |
| JP | 2008238769 | A | 10/2008 |
| JP | 2010241076 | A * | 10/2010 |
| JP | 2012011767 | A | 1/2012 |
| JP | 2019025701 | A | 2/2019 |
| WO | 2014007329 | A1 | 1/2014 |

OTHER PUBLICATIONS

Written Opinion of the International Searching Authority issued by the Japanese Patent Office acting as the International Searching Authority in relation to International Application No. PCT/JP2021/019488 dated Jun. 22, 2021 (4 pages).

* cited by examiner

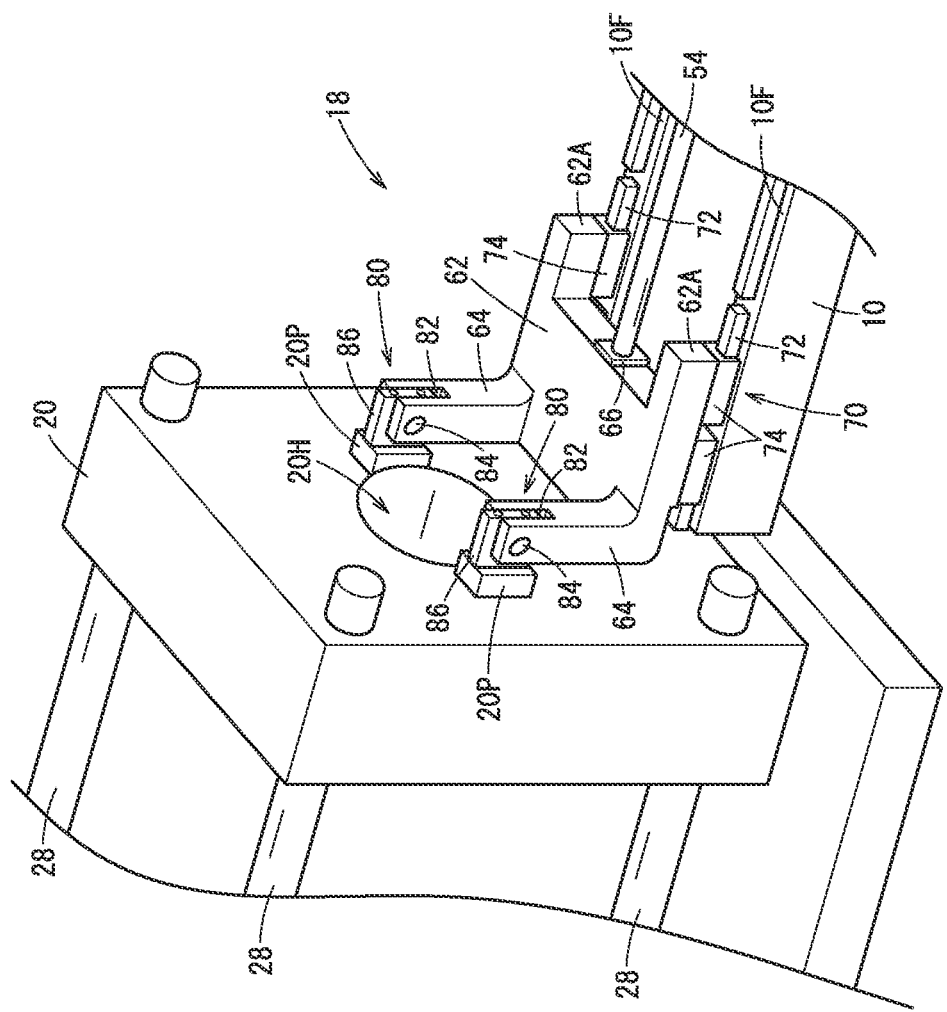
FIG. 3
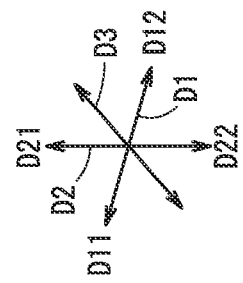

FIG. 7
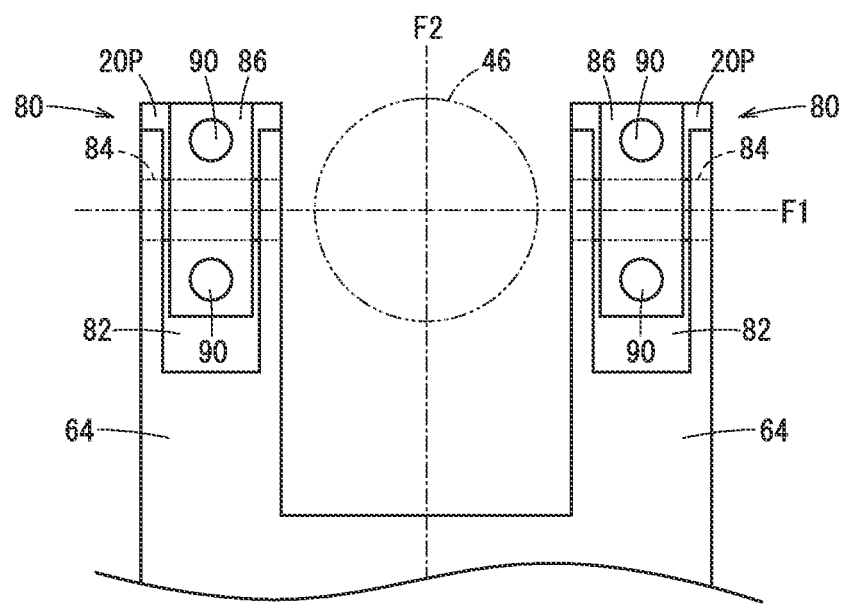
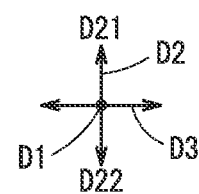

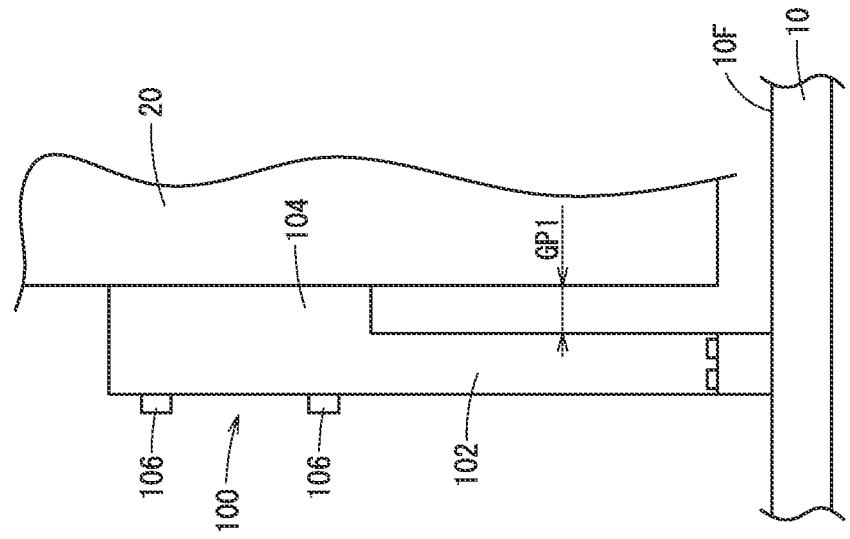
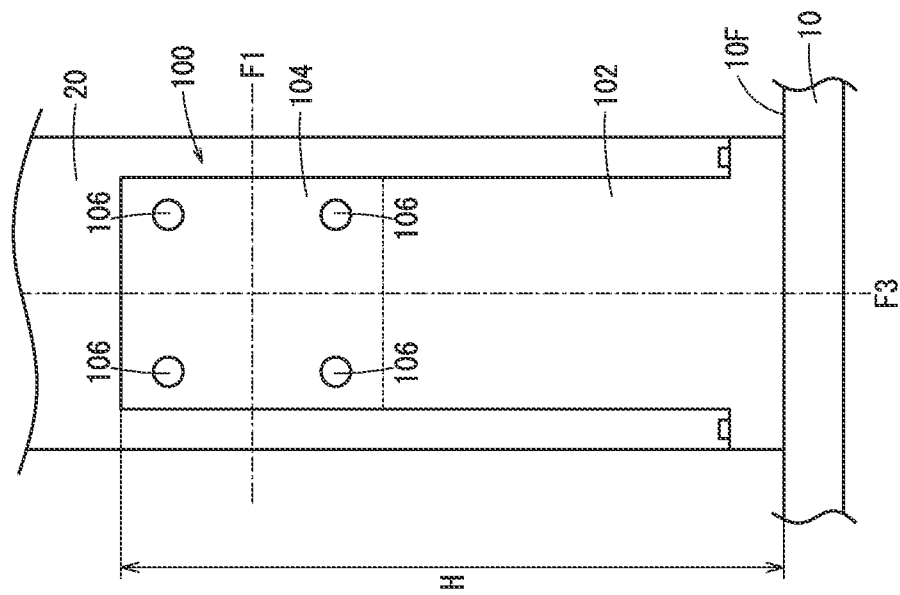

INJECTION MOLDING MACHINE

CROSS-REFERENCE TO RELATED APPLICATIONS

This application is a national phase entry under 35 U.S.C. 371 of PCT International Application No. PCT/JP2021/019488, filed May 24, 2021, which claims priority to Japanese Patent Application No. 2020-093311, filed May 28, 2020, the disclosure of each of these applications is expressly incorporated herein by reference in their entirety.

TECHNICAL FIELD

The present invention relates to an injection molding machine for injecting a molten material into a mold.

BACKGROUND ART

JP 2019-025701 A discloses an injection molding machine in which a stationary platen and a nozzle touch mechanism are connected by a connecting member having arm portions extending upward from a support base supported by a machine base. In this injection molding machine, when the nozzle of the injection unit is pressed against the mold by the nozzle touch mechanism, a force (nozzle touch force) that pulls the connecting member is generated in the connecting member as a reaction force of the pressing force.

In the connecting member disclosed in JP 2019-025701 A, a connecting portion (second connecting portion) connected to the stationary platen is disposed to be rotatable in a direction along a moving direction of the injection unit. Thus, a moment generated when the connecting member is inclined toward the stationary platen due to the generation of the nozzle touch force is converted into rotation of the connecting portion (second connecting portion). Therefore, in JP 2019-025701 A, a moment is less likely to be generated in a direction in which the stationary platen falls down, and the fall-prevention effect, i.e., preventing the stationary platen from falling down by the connecting member, is obtained.

SUMMARY OF THE INVENTION

By the way, if the stationary platen falls down even slightly, there is a concern that an inconvenience occurs in mold clamping or the like and consequently a good molded product cannot be obtained. Therefore, there has been a demand for improving the fall-prevention effect of preventing the stationary platen from falling down by the connecting member.

Therefore, an object of the present invention is to provide an injection molding machine capable of improving the effect of preventing the stationary platen from falling down by the connecting member.

According to an aspect of the present invention, there is provided an injection molding machine including:

an injection unit including a nozzle configured to inject a molten material into a mold fixed to a stationary platen and a movable platen;

a machine base on which the injection unit is mounted;

a nozzle touch mechanism configured to press the nozzle against the mold by moving the injection unit relative to the machine base in a first direction of approaching the mold; and a connecting member configured to be slidable relative to the machine base in the first direction and a second direction opposite to the first direction and to connect the nozzle touch mechanism and the stationary platen, wherein the connecting member includes a support base configured to be slidably attached to the machine base and an arm portion rising upward from a portion of the support base that is positioned on a side of the stationary platen, the support base includes a first connecting portion to which the nozzle touch mechanism is connected, and an upper portion of the arm portion includes a second connecting portion to which the stationary platen is connected, the second connecting portion of the connecting member includes a connecting pin fixed to the arm portion and extending in a widthwise direction of the machine base which is parallel to a mounting surface of the machine base and orthogonal to the first direction, and a rotating member fixed to the stationary platen and configured to be rotatable about the connecting pin, and the connecting pin is disposed so as to include a plane that passes through a central axis of the nozzle and that is parallel to the mounting surface of the machine base.

According to the aspect of the invention, it is possible to suppress inclination of the connecting member, compared to a case where the connecting pin is disposed so as not to include a plane that passes through the central axis of the nozzle and that is parallel to the mounting surface of the machine base. Further, even if the connecting member is inclined toward the stationary platen side, the moment generated by the inclination can be converted into the rotation of the second connecting portion. As a result, it is possible to improve the effect of preventing the stationary platen from falling down by the connecting member.

BRIEF DESCRIPTION OF DRAWINGS

FIG. 3 is a perspective view showing a connecting member;

FIG. 7 is a front view of a platen connecting portion as viewed from the injection unit side;

FIG. 10A is a view of one stationary platen support portion as viewed from one side surface side in the left-right direction of the stationary platen; and FIG. 10B is a view of the stationary platen support portion as viewed from the injection unit side.

DESCRIPTION OF THE INVENTION

Embodiment

[Configuration of Injection Molding Machine]

Figure 1:
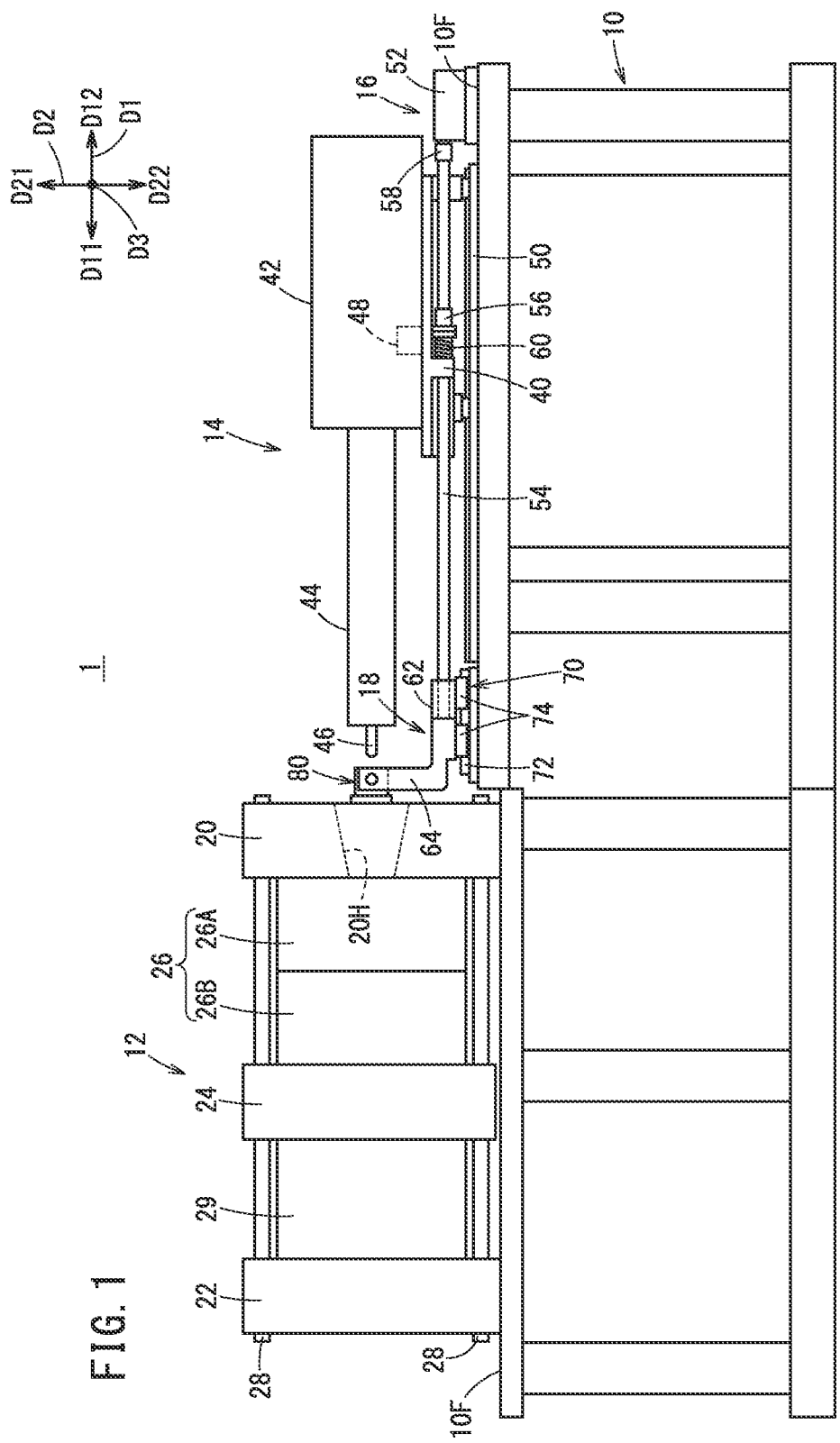
FIG. 1 is a schematic view showing a configuration of an injection molding machine.
Figure 2:
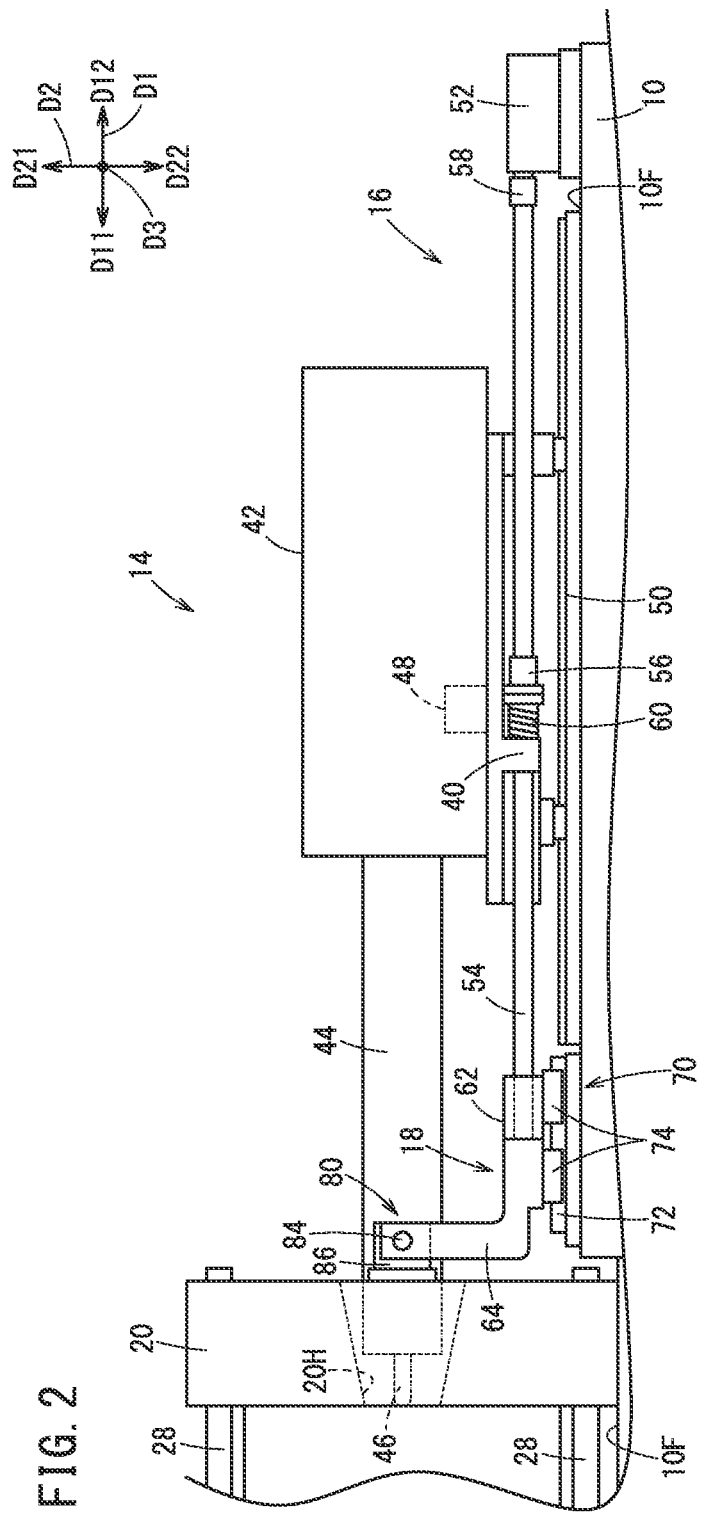
FIG. 2 is a schematic view showing a part of the injection molding machine in an injection state.

FIG. 1 is a schematic view showing a configuration of an injection molding machine 1, and FIG. 2 is a schematic view showing a part of the injection molding machine 1 in an injection state. In the present embodiment, D1 in the drawings is a front-rear direction, D2 in the drawings is an up-down direction, and D3 in the drawings is a left-right direction. The front-rear direction D1, the up-down direction D2, and the left-right direction D3 are orthogonal to each other. In addition, in the present embodiment, D11 in the drawings is a forward direction, D12 in the drawings is a rearward direction, D21 in the drawings is an upward direction, and D22 in the drawings is a downward direction. The downward direction D22 may be a direction in which gravity acts or may be a direction different from the direction in which gravity acts.

The injection molding machine 1 includes a machine base 10, a mold clamping unit 12, an injection unit 14, a nozzle touch mechanism 16, and a connecting member 18.

The machine base 10 is a base on which the mold clamping unit 12, the injection unit 14, the nozzle touch mechanism 16, and the connecting member 18 are mounted, and has a mounting surface 10F. The mounting surface 10F on which the mold clamping unit 12 is mounted and the mounting surface 10F on which the injection unit 14, the nozzle touch mechanism 16, and the connecting member 18 are mounted may be the same surface or may be different surfaces shifted in the up-down direction D2. Note that, in the present embodiment, a case where the mounting surface 10F on which the mold clamping unit 12 is mounted and the mounting surface 10F on which the injection unit 14, the nozzle touch mechanism 16, and the connecting member 18 are mounted are difference surfaces shifted in the up-down direction D2 is shown as an example.

In the machine base 10, a first machine base on which the mold clamping unit 12 is mounted and a second machine base on which the injection unit 14, the nozzle touch mechanism 16, and the connecting member 18 are mounted may be separably connected. When the first machine base and the second machine base are separably connected to each other, the connected first machine base and second machine base can be separated from each other at the time of maintenance, for example. Therefore, access to the mold clamping unit 12, the injection unit 14, and the like becomes easy, and it is possible to individually perform maintenance of the mold clamping unit 12, the injection unit 14, and the like.

The mold clamping unit 12 includes a stationary platen 20, a rear platen 22, a movable platen 24, a mold 26, a plurality of tie bars 28, and a platen drive mechanism 29.

The stationary platen 20 and the rear platen 22 are mounted at an interval from each other on the mounting surface 10F of the machine base 10 of the injection molding machine 1. A nozzle insertion hole 20H is formed in the stationary platen 20. The movable platen 24 is arranged between the stationary platen 20 and the rear platen 22. The mold 26 is constituted by a fixed mold 26A and a movable mold 26B. The fixed mold 26A is attached to a side of the stationary platen 20 that faces the movable platen 24, and the movable mold 26B is attached to a side of the movable platen 24 that faces the stationary platen 20. Each of the plurality of tie bars 28 is a rod-shaped member. One of both ends of the tie bar 28 is fixed to the stationary platen 20, and the other of both ends of the tie bar 28 is fixed to the rear platen 22. Each of the plurality of tie bars 28 penetrate through the movable platen 24. The movable platen 24 is movable along the tie bars 28.

The platen drive mechanism 29 closes the mold 26 by moving the movable platen 24 in a platen approach direction (rearward direction D12) in which the movable platen 24 approaches the stationary platen 20. On the other hand, the platen drive mechanism 29 opens the mold 26 by moving the movable platen 24 in a platen separation direction (forward direction D11) in which the movable platen 24 is separated from the stationary platen 20. The movable mold 26B is in contact with the fixed mold 26A in a state where the mold 26 is clamped, and the movable mold 26B is not in contact with the fixed mold 26A in a state where the mold 26 is opened.

The injection unit 14 includes a base part 40, an injection unit main body 42, a cylinder part 44, and a nozzle 46.

The base part 40 is a base of the injection unit 14, and is slidably attached to a plurality of guide rails 50 provided on the mounting surface 10F of the machine base 10. The plurality of guide rails 50 extend in parallel along the front-rear direction D1 and are disposed at regular intervals in the left-right direction D3. The injection unit main body 42 is placed on the base part 40, and is connected to the base part 40 so as to be rotatable with a swivel pin 48 as the rotation center. The cylinder part 44 is fixed to the injection unit main body 42, and extends along the guide rails 50 from a surface of the injection unit main body 42 that faces the stationary platen 20 toward the mold clamping unit 12. The nozzle 46 serves to inject a molten material, and extends along the guide rails 50 from the tip of the cylinder part 44 toward the mold clamping unit 12.

The injection unit 14 is movable along the plurality of guide rails 50 in a first direction (forward direction D11) of approaching the mold 26 and in a second direction (rearward direction D12) of separating away from the mold 26. The injection unit 14 is moved in the forward direction D11 or the rearward direction D12 by the nozzle touch mechanism 16.

The nozzle touch mechanism 16 includes a motor 52, a ball screw shaft 54, and a ball screw nut 56.

The motor 52 is a motor for moving the injection unit 14 in the forward direction D11 or the rearward direction D12. The ball screw shaft 54 extends along the front-rear direction D1. A rear end of the ball screw shaft 54 is coupled to a rotor shaft of the motor 52 via a coupling 58, and a front end of the ball screw shaft 54 is coupled to the connecting member 18. The ball screw nut 56 is screw-engaged with the ball screw shaft 54, and is connected to the base part 40 via a spring 60 so as not to be rotatable with respect to the base part 40 of the injection unit main body 42. Note that the spring 60 may be omitted.

For moving the injection unit 14 relative to the machine base 10 in the rearward direction D12, the nozzle touch mechanism 16 drives the motor 52 in a reverse rotation direction (or a forward rotation direction). When the motor 52 is driven in the reverse rotation direction (or the forward rotation direction), the ball screw shaft 54 coupled to the rotor shaft of the motor 52 rotates, and the ball screw nut 56 screw-engaged with the ball screw shaft 54 moves in the rearward direction D12. Accordingly, the injection unit 14 moves in the rearward direction D12.

On the other hand, for moving the injection unit 14 relative to the machine base 10 in the forward direction D11, the nozzle touch mechanism 16 drives the motor 52 in the forward rotation direction (or the reverse rotation direction).

When the motor 52 is driven in the forward rotation direction (or the reverse rotation direction), the ball screw shaft 54 coupled to the rotor shaft of the motor 52 rotates, and the ball screw nut 56 screw-engaged with the ball screw shaft 54 moves in the forward direction D11. Accordingly, the injection unit 14 moves in the forward direction D11. When the injection unit 14 moves in the forward direction D11, the nozzle 46 of the injection unit 14 is inserted into the nozzle insertion hole 20H of the stationary platen 20, and comes into contact with the nozzle contact portion (spool) of the mold 26 through the nozzle insertion hole 20H (see FIG. 2).

For injecting a molten material into the mold 26, the nozzle touch mechanism 16 presses the nozzle 46 of the injection unit 14 against the mold 26 by moving the injection unit 14 in the forward direction D11 relative to the machine base 10. That is, the nozzle touch mechanism 16 moves the ball screw nut 56 in the front direction D11 by driving the motor 52 in the forward rotation direction (or the reverse rotation direction) even after the nozzle 46 has come into contact with the nozzle contact portion (spool) of the mold 26. As a result, the spring 60 is compressed, and the compression reaction force brings the injection unit 14 into a nozzle touch state in which the nozzle 46 is pressed against the spool of the mold 26. In a case where the spring 60 is omitted, the injection unit 14 is brought into the nozzle touch state by continuously driving the motor 52 in the forward rotation direction (or the reverse rotation direction). In addition, in a case where the spring 60 is provided, it is possible to maintain the nozzle touch state even when the motor 52 stops in a state in which the spring 60 is compressed. The injection unit 14 injects a molten material of resin or metal into the mold 26 in the nozzle touch state.

The connecting member 18 connects the stationary platen 20 and the nozzle touch mechanism 16. FIG. 3 is a perspective view showing the connecting member 18. The connecting member 18 includes a support base 62 and a pair of arm portions 64, and is formed in a substantially L-shape in a side view.

The support base 62 is slidable in the forward direction D11 or the rearward direction D12 relative to the machine base 10, and is supported by the machine base 10 via a linear motion mechanism 70. The linear motion mechanism 70 is provided in order to allow the support base 62 to slide in the forward direction D11 or the rearward direction D12 relative to the machine base 10, and includes a plurality of support rails 72 and a plurality of guide blocks 74.

Each of the plurality of support rails 72 extends along the front-rear direction D1. The number of the support rails 72 may be two as illustrated in FIG. 3, or may be three or more. The plurality of support rails 72 are arranged at regular intervals in the left-right direction D3. The left-right direction D3 coincides with the widthwise direction of the machine base 10. The widthwise direction of the machine base 10 is parallel to the mounting surface 10F of the machine base 10 and orthogonal to the first direction (forward direction D11) in which the injection unit 14 approaches the mold 26.

Each of the plurality of guide blocks 74 is slidably engaged with the support rail 72. One or more guide blocks 74 are provided for each support rail 72. When the number of guide blocks 74 provided for one support rail 72 is two or more, the guide blocks 74 are disposed at intervals in the front-rear direction D1. In the example shown in FIG. 3, two guide blocks 74 are provided for each support rail 72.

The support base 62 may have a pair of protruding leg portions 62A that protrude toward the injection unit 14 (rearward direction D12) from both end portions of the support base 62 in the left-right direction D3. Each protruding leg portion 62A is disposed directly above the support rail 72, and protrudes from the support base 62 along the support rail 72. The support base 62 has a bearing portion 66 on an end surface thereof that lies between the pair of protruding leg portions 62A and that face toward the injection unit 14 (i.e., facing in the rearward direction D12). The other end of the ball screw shaft 54 of the nozzle touch mechanism 16 is attached to the bearing portion 66. That is, the bearing portion 66 is a portion to which the nozzle touch mechanism 16 is connected, and in the present embodiment, a case where the bearing portion 66 is located at a position recessed toward the stationary platen 20 from the pair of protruding leg portions 62A is shown as an example.

The pair of arm portions 64 rise upward (upward direction D21) from a portion of the support base 62 that is positioned on the stationary platen 20 side (forward direction D11 side) with a space between the arm portions in the left-right direction D3. In the case of this embodiment, the pair of arm portions 64 rise upward (upward direction D21) from the support base 62 along a surface of the stationary platen 20 that faces toward the injection unit 14 (faces in the rearward direction D12). Each of the pair of arm portions 64 has a platen connecting portion 80 at an upper portion of the arm portion 64 rising from the support base 62. The stationary platen 20 is connected to the platen connecting portions 80.

The platen connecting portions 80 are provided so as to be symmetrical with respect to the nozzle 46 in the left-right direction. Since the configurations of the platen connecting portions 80 are the same, the configuration of one platen connecting portion 80 will be described below.

The platen connecting portion 80 is connected to the stationary platen 20 in a manner so as to be rotatable relative to the stationary platen 20. The platen connecting portion 80 includes a cutout portion 82, a connecting pin 84, and a rotating member 86.

The cutout portion 82 is a portion formed by cutting out an upper portion of the arm portion 64. The cutout portion 82 is located at a substantially intermediate position between both ends of the arm portion 64 in the widthwise direction (left-right direction D3), and extends in the front-rear direction D1 from an end surface of the arm portion 64 on the stationary platen 20 side (forward direction D11 side) to an end surface thereof on the injection unit 14 side (rearward direction D12 side).

The connecting pin 84 is disposed in the cutout portion 82 and extends in the left-right direction D3. The connecting pin 84 is fixed to the arm portion 64 at positions in the left-right direction D3 of the cutout portion 82. That is, the connecting pin 84 is not rotatable relative to the arm portion 64, and is not slidable relative to the arm portions 64 in any of the front-rear direction D1, the up-down direction D2, and the left-right direction D3.

The connecting pin 84 disposed in the cutout portion 82 penetrates through the rotating member 86. The rotating member 86 is fixed to the stationary platen 20 so as to be rotatable about the connecting pin 84.

Figure 4:
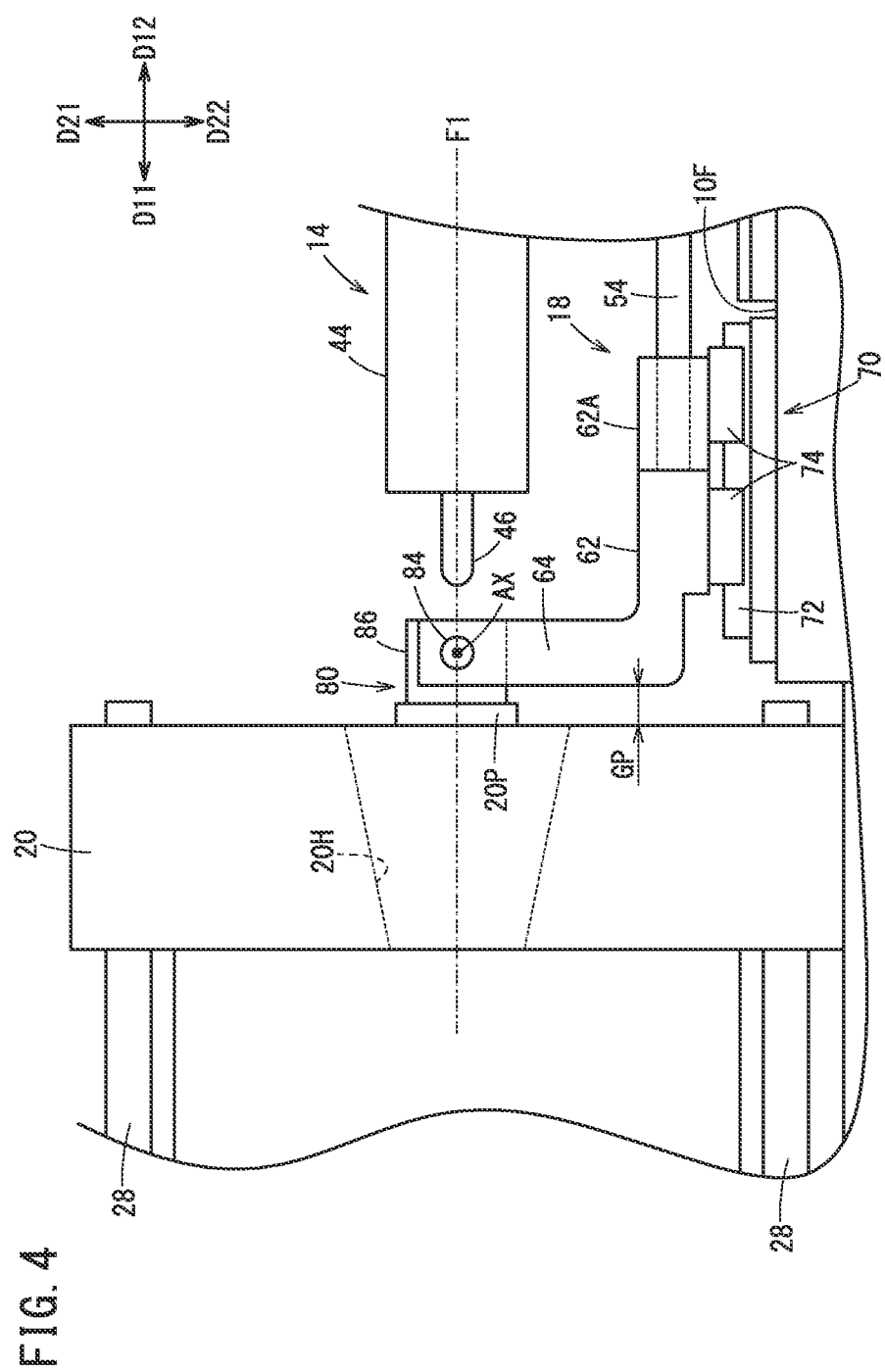
FIG. 4 is a schematic view showing the relationship between the connecting member and the nozzle of the injection unit.

FIG. 4 is a schematic view showing the relationship between the connecting member 18 and the nozzle 46 of the injection unit 14. The connecting pin 84 of the connecting member 18 is located at substantially the same height as the nozzle 46 of the injection unit 14. That is, the connecting pin 84 is disposed so as to include a plane F1 that passes through the central axis of the nozzle 46 and that is parallel to the mounting surface 10F of the machine base 10. The pin axes AX of the connecting pins 84 are preferably located on the plane F1. Since the connecting pin 84 is disposed so as to include the plane F1, the rotating member 86 rotatable about the connecting pin 84 is also disposed so as to include the plane F1. The height of the connecting pin 84 is a height from the mounting surface 10F of the machine base 10 (a length extending from the mounting surface 10F in the upward direction D21). The central axis of the nozzle 46 is a line passing through the radial center of the nozzle 46 along the direction in which the nozzle 46 extends.

Figure 5:
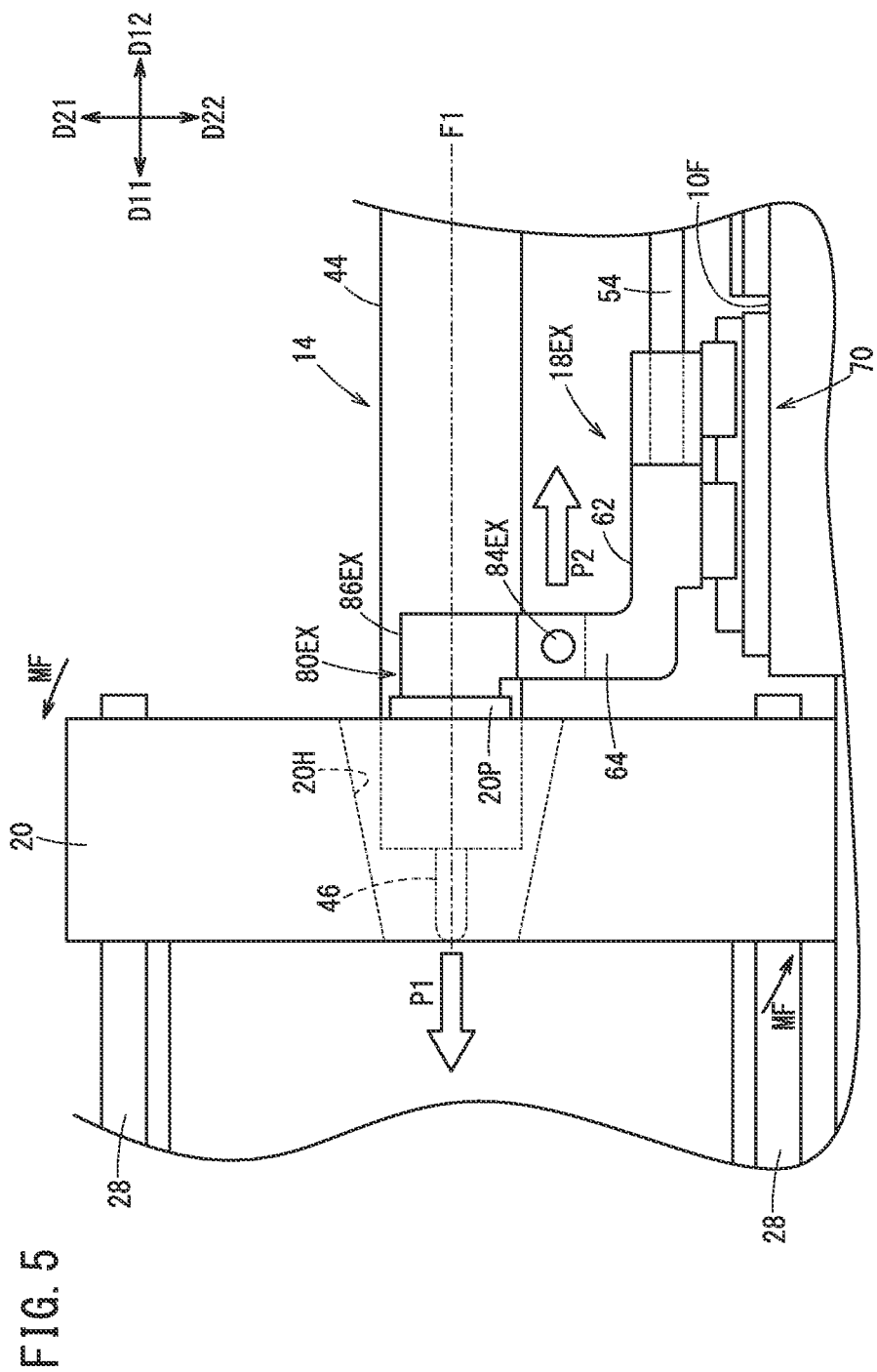
FIG. 5 is a schematic view showing how force is generated in a comparative example.

FIG. 5 is a schematic view showing how force is generated in a comparative example. This comparative example assumes the above-mentioned JP 2019-025701 A. In the present comparative example, a connecting member 18EX is provided instead of the connecting member 18 of the present embodiment. The connecting member 18EX includes a platen connecting portion 80EX different from the platen connecting portion 80 of the present embodiment and a rotating member 86EX different from the rotating member 86 of the present embodiment. The platen connecting portion 80EX is different from the platen connecting portion 80 of the present embodiment in that the connecting pin 84EX is disposed closer to the machine base 10 (on the downward direction D22 side) than the plane F1 which passes through the central axis of the nozzle 46 and is parallel to the mounting surface 10F of the machine base 10. The rotating member 86EX has a shape different from the shape of the rotating member 86 of the present embodiment. In this comparative example, the configuration other than the platen connecting portion 80EX and the rotating member 86EX is the same as that of the present embodiment.

When the nozzle 46 of the injection unit 14 is pressed against the mold 26 by the nozzle touch mechanism 16, a nozzle touch force P2 is generated in the connecting member 18EX as a reaction force of the pressing force P1. In the connecting member 18EX, since the support base 62 of the platen connecting portion 80EX is slidable in the forward direction D11 or the rearward direction D12 relative to the machine base 10, the nozzle touch force P2 is generated mainly in the connecting pin 84EX of the connecting member 18EX.

In the case of the present comparative example, the connecting pin 84EX is disposed closer to the machine base 10 (on the downward direction D22 side) than the plane F1 that passes through the central axis of the nozzle 46 and is parallel to the mounting surface 10F of the machine base 10. For this reason, the line of action of the pressing force P1 and the line of action of the nozzle touch force P2, which is the reaction force of the pressing force, are not aligned on the same straight line. Therefore, a moment MF is generated in a direction in which the stationary platen 20 falls down.

Figure 6:
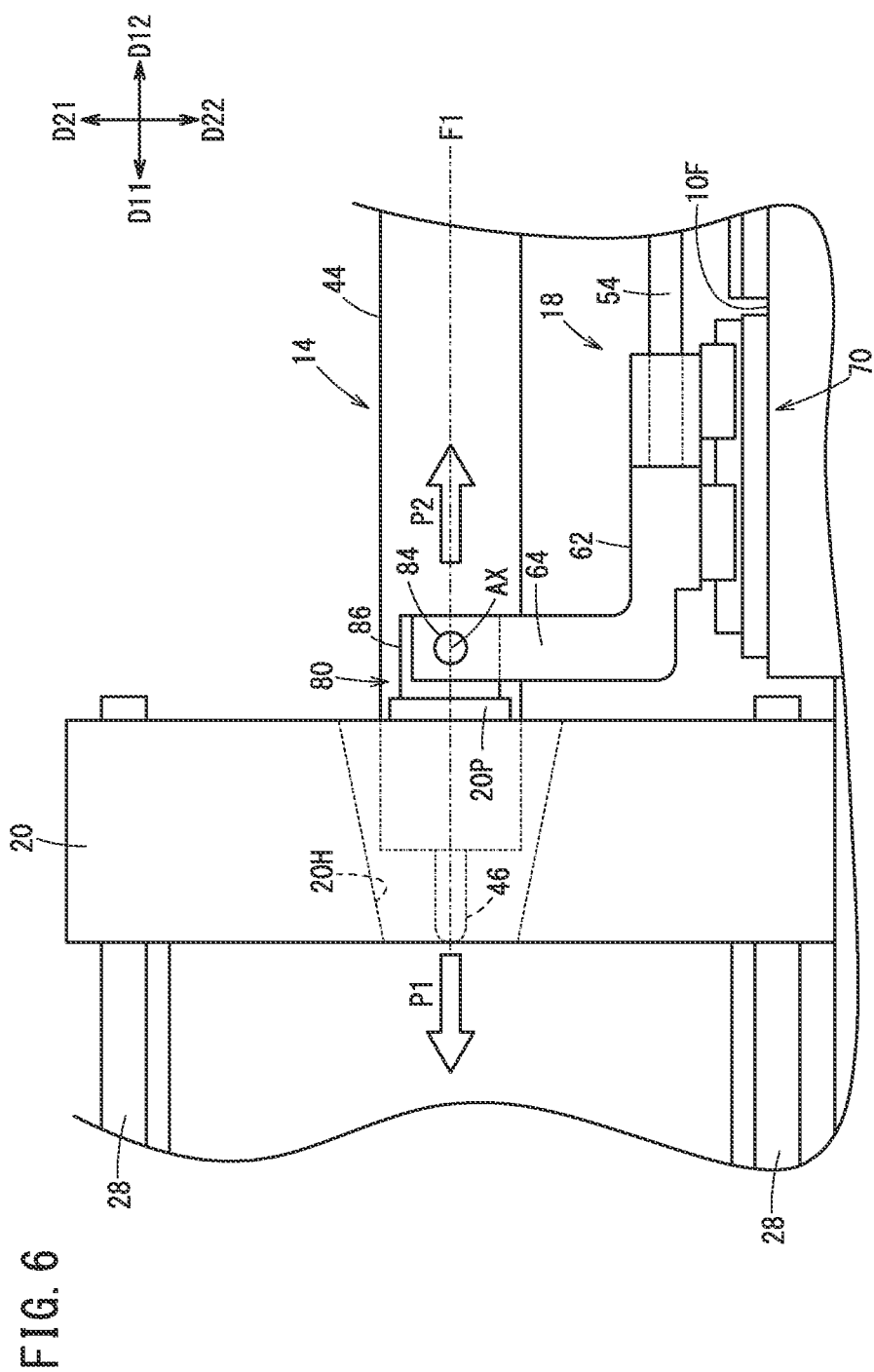
FIG. 6 is a schematic view showing how force is generated in the present embodiment.

FIG. 6 is a schematic view showing how force is generated in the present embodiment. In the case of the present embodiment, the connecting pin 84 is disposed so as to include the plane F1 that passes through the central axis of the nozzle 46 and that is parallel to the mounting surface 10F of the machine base 10. Therefore, the line of action of the pressing force P1 and the line of action of the nozzle touch force P2, which is the reaction force thereof, are aligned on the same straight line. Therefore, the moment MF is hardly generated in the direction in which the stationary platen 20 falls down, and it is possible to improve the effect of preventing the stationary platen 20 from falling down by the connecting member 18. In the present embodiment, even if the connecting member 18 is inclined toward the stationary platen 20, the moment MF generated by the inclination can be converted into rotation of the platen connecting portion 80.

FIG. 7 is a front view of the platen connecting portion 80 viewed from the injection unit 14 side. The pair of platen connecting portions 80 are provided symmetrically with respect to a plane F2 that passes through the central axis of the nozzle 46 and is orthogonal to the mounting surface 10F of the machine base 10. Accordingly, it is possible to strengthen the connection between the stationary platen 20 and the connecting member 18 compared to a case in which only one platen connecting portion 80 is provided. It is possible to suppress variations in the force acting on each of the platen connecting portions 80.

The rotating member 86 of each platen connecting portion 80 is fixed to the stationary platen 20 by a plurality of first fasteners 90 at both sides of the connecting pin 84. Of the both sides, one side is a machine base side that is closer to the machine base 10 than the connecting pin 84 is (i.e., the downward direction D22 side), and the other side is opposite to the machine base 10 side (i.e., the upward direction D21 side). Accordingly, compared to a case where the rotating member 86 is fixed to the stationary platen 20 at one side and the other side of the connecting pin 84 in the left-right direction D3, it is possible to effectively suppress the connecting member 18 from being inclined toward the stationary platen 20.

The first fastener 90 is a tool for fixing an object to be fixed, to a fixing object, and examples of the first fastener 90 include bolts and the like. The plurality of first fasteners 90 are provided symmetrically with respect to the plane F1 that passes through the central axis of the nozzle 46 and is parallel to the mounting surface 10F of the machine base 10. Accordingly, it is possible to suppress variations in the force acting on each of the plurality of first fasteners 90.

In the present embodiment, a pair of pedestal portions 20P are provided on a surface of the stationary platen 20 that faces toward the injection unit 14. The rotating member 86 of each platen connecting portion 80 is fixed to each pedestal portion 20P by two first fasteners 90. In addition, the rotating member 86 of each platen connecting portion 80 has a portion slightly protruding toward the stationary platen 20 beyond the arm portion 64. Therefore, in a state in which the rotating member 86 is fixed to the pedestal portion 20P, a predetermined gap GP is formed between the stationary platen 20 and the arm portion 64 (FIG. 4). That is, the connecting member 18 and the stationary platen 20 do not interfere with each other except at the rotating member 86 and the pedestal portion 20P. Therefore, it is possible to prevent heat of the molten material or the like injected into the mold 26 from being conducted to the connecting member 18 via the stationary platen 20.

(Modifications)

The above-described embodiment may be modified in the following manner.

(Modification 1)

Figure 8:
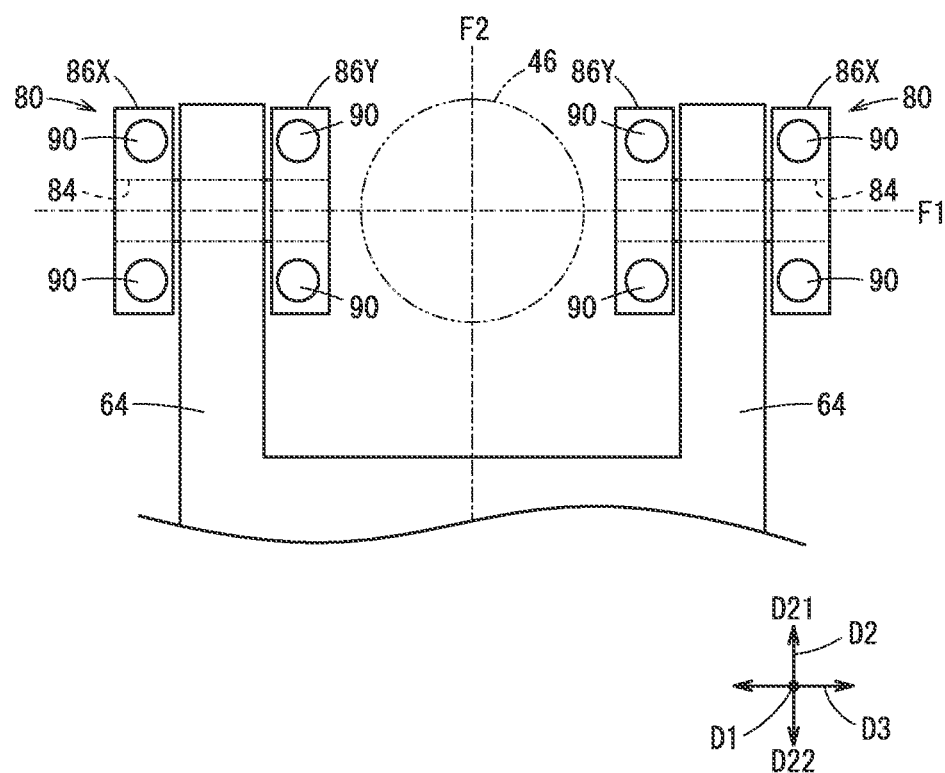
FIG. 8 is a schematic view illustrating a platen connecting portion according to a first modification.

FIG. 8 is a schematic view illustrating a platen connecting portion 80 according to a first modification. Since the structures of the pair of platen connecting portions 80 of the present modification are the same, the structure of one platen connecting portion 80 will be described, as in the embodiment.

In the present modification, the cutout portions 82 (FIG. 7) provided in the arm portions 64 are omitted, and in each arm portion, the connecting pin 84 protrudes from both ends of the arm portion 64 in the widthwise direction (left-right direction D3). In the present modification, the platen connecting portion 80 includes a pair of rotating members 86X and 86Y instead of the rotating member 86 of the embodiment. The pair of rotating members 86X and 86Y may be connected to each other or may not be connected to each other. FIG. 8 illustrates a case in which the pair of rotating members 86X and 86Y are not connected.

The rotating member 86X is fixed to the stationary platen 20 so as to be rotatable about a portion of the connecting pin 84 that protrudes from one end of the both ends of the arm portion 64 in the widthwise direction (the left-right direction D3). The rotating member 86Y is fixed to the stationary platen 20 so as to be rotatable about a portion of the connecting pin 84 that protrudes from the other end of the both ends of the arm portion 64 in the widthwise direction (the left-right direction D3).

Note that in FIG. 8, each of the rotating member 86X and the rotating member 86Y is fixed by a plurality of first fasteners 90 at both sides of the connecting pin 84. Of the both sides, one side is a machine base 10 side that is closer to the machine base 10 than the connecting pin 84 is (i.e., the downward direction D22 side), and the other side is opposite to the machine base 10 side (i.e., the upward direction D21 side). As in the embodiment, the first fasteners 90 are provided symmetrically with respect to the plane F1 that passes through the central axis of the nozzle 46 and is parallel to the mounting surface 10F of the machine base 10.

In this way, the platen connecting portion 80 of the present modification is coupled to the stationary platen 20 in a state of being rotatable with respect to the stationary platen 20, similarly to the platen connecting portion 80 of the embodiment, although the configuration thereof is different from the configuration of the platen connecting portion 80 of the embodiment. Therefore, similarly to the embodiment, even if the connecting member 18 is inclined toward the stationary platen 20, the moment MF generated due to the inclination can be converted into rotation of the platen connecting portion 80.

The pedestal portions 20P (see FIG. 3) for the rotating member 86X and the rotating member 86Y may be provided on the surface of the stationary platen 20 that faces toward the injection unit 14, or may be omitted. In addition, similarly to the embodiment, each of the rotating member 86X and the rotating member 86Y may have a portion slightly protruding toward the stationary platen 20 beyond the arm portion 64. In a case where each of the rotating member 86X and the rotating member 86Y has a portion that protrudes toward the stationary platen 20 beyond the arm portion 64, as in the embodiment, a predetermined gap GP (FIG. 4) is formed between the stationary platen 20 and the arm portion 64. Therefore, similarly to the embodiment, it is possible to prevent heat of the molten material or the like injected into the mold 26 from being conducted to the connecting member 18 via the stationary platen 20.

(Modification 2)

The number of the platen connecting portions 80 and the number of the arm portions 64 may each be one, or three or more. From the viewpoint of suppressing variation in the force acting on each of the platen connecting portions 80, as shown in FIG. 7, it is preferable that the plurality of platen connecting portions 80 and the arm portions 64 should be provided symmetrically with respect to the plane F2 that passes through the central axis of the nozzle 46 and is orthogonal to the mounting surface 10F of the machine base 10.

(Modification 3)

Figure 9:
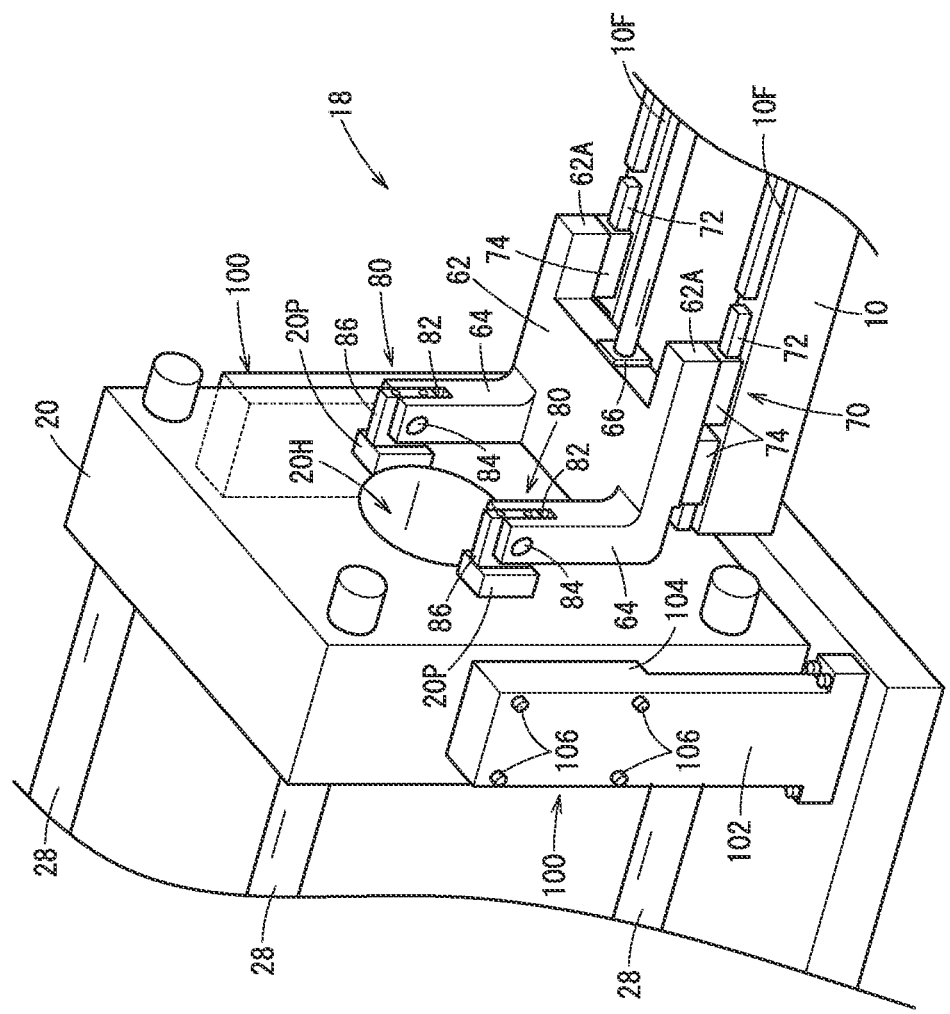
FIG. 9 is a schematic view showing an injection molding machine according to a second modification as viewed from the same side as in FIG. 3.

FIG. 9 is a schematic view showing the injection molding machine 1 of Modification 2 from the same viewpoint as FIG. 3. In the present modification, at least two stationary platen support portions 100 that support both sides of the stationary platen 20 in the left-right direction D3 are provided. In FIG. 9, one stationary platen support portion 100 that supports the right side (or left side) of the stationary platen 20 and another stationary platen support portion 100 that supports the left side (or right side) of the stationary platen 20 are shown.

The stationary platen support portions 100 are arranged symmetrically with respect to the plane F2 (see FIG. 7) that passes through the central axis of the nozzle 46 and is orthogonal to the mounting surface 10F of the machine base 10, and the stationary platen 20 is disposed symmetrically with respect to the plane F2. Accordingly, it is possible to suppress variation in the force generated in the contact portion between the stationary platen support portion 100 and the stationary platen 20, and it is possible to stably support the stationary platen 20 by each of the stationary platen support portions 100.

The stationary platen 20 supported by each stationary platen support portion 100 may not be in contact with the machine base 10. FIG. 9 shows a case where the stationary platen 20 is not in contact with the machine base 10. In a case where the stationary platen 20 is not in contact with the machine base 10, the machine base 10 side (the downward direction D22 side) of the stationary platen 20 and the opposite side (the upward direction D21 side) are less likely to be asymmetrically deformed, compared to a case where the stationary platen 20 is in contact with the machine base 10. That is, in a case where the stationary platen 20 is not in contact with the machine base 10, even if the stationary platen 20 expands due to heat or the like conducted from the mold 26, it is possible to reduce asymmetric deformation of the stationary platen 20 in the up-down direction D2. Therefore, in a case where the stationary platen 20 is not in contact with the machine base 10, it is possible to further suppress the inclination of the stationary platen 20 in the falling-down direction caused by the connecting member 18, compared to a case where the stationary platen 20 is in contact with the machine base 10.

The stationary platen support portions 100 have the same configuration. Hereinafter, the configuration of one stationary platen support portion 100 will be described. FIG. 10A is a view of one stationary platen support portion 100 as viewed from one side surface side of the left-right direction D3 of the stationary platen 20, and FIG. 10B is a view of the stationary platen support portion 100 as viewed from the injection unit 14 side. The stationary platen support portion 100 includes a support main body 102 and a protruding portion 104 that slightly protrudes from the support main body 102 toward the stationary platen 20.

The stationary platen support portion 100 is fixed to the stationary platen 20 in a state in which the protruding portion 104 is in contact with the side surface of the stationary platen 20 in the left-right direction D3. In this state, a predetermined gap GP1 is formed between the stationary platen 20 and the stationary platen support portion 100 other than the protruding portion 104. That is, the stationary platen support portion 100 does not interfere with the stationary platen 20 except at the protruding portion 104. Therefore, in a case where the predetermined gap GP1 is formed between the stationary platen support portion 100 and the stationary platen 20, it is possible to further suppress the inclination of the stationary platen 20 in the falling direction due to the connecting member 18, compared to a case where the gap GP1 is not formed.

The stationary platen support portion 100 is fixed to the stationary platen 20 by a plurality of second fasteners 106. The second fastener 106 is a tool for fixing an object to be fixed, to a fixing object, and examples of the second fastener 106 include bolts and the like. The second fastener 106 may have the same configuration as the first fastener 90 or may have a different configuration.

The plurality of second fasteners 106 are arranged symmetrically with respect to the plane F1 that passes through the central axis of the nozzle 46 and is parallel to the mounting surface 10F of the machine base 10. Further, the plurality of second fasteners 106 are arranged symmetrically with respect to a plane F3 that passes through the thickness-direction center of the stationary platen 20 of the front-rear direction D1 and is orthogonal to the mounting surface 10F of the machine base 10. Accordingly, it is possible to suppress variation in force acting on each of the plurality of second fasteners 106.

The height H of the stationary platen support portion 100 from the machine base 10 may exceed the level of the plane F1 that passes through the central axis of the nozzle 46 and is parallel to the mounting surface 10F of the machine base 10. In a case where the height H of the stationary platen support portion 100 exceeds the level of the plane F1, it is possible to reliably and stably suppress the falling-down of the stationary platen 20 caused by the connecting member 18, compared to a case where the height H does not exceed the level of the plane F1.

(Modification 4)

The above-described embodiment and the modifications may be optionally combined within a range in which no technical inconsistencies occur.

[Inventions]

The inventions that can be grasped from the above-described embodiment and the modifications thereof will be described below.

The present invention is characterized by the injection molding machine (1) including the injection unit (14), the machine base (10), the nozzle touch mechanism (16), and the connecting member (18). The injection unit (14) includes the nozzle (46) configured to inject a molten material into the mold (26) fixed to the stationary platen (20) and the movable platen (24). The injection unit (14) is mounted on the machine base (10). The nozzle touch mechanism (16) presses the nozzle (46) against the mold (26) by moving the injection unit (14) in the first direction (D11) of approaching the mold (26) relative to the machine base (10). The connecting member (18) is configured to be slidable relative to the machine base (10) in the first direction (D11) and the second direction (D12) opposite to the first direction (D11) and to connect the nozzle touch mechanism (16) and the stationary platen (20). The connecting member (18) includes the support base (62) configured to be slidably attached to the machine base (10) and the arm portions (64) rising upward from a portion of the support base (62) that is positioned on the stationary platen (20) side, the support base (62) includes the first connecting portion (66) to which the nozzle touch mechanism (16) is connected, and an upper portion of the arm portion (64) includes the second connecting portion (80) to which the stationary platen (20) is connected. The second connecting portion (80) of the connecting member (18) includes the connecting pin (84) fixed to the arm portion (64) and extending in the widthwise direction (D3) of the machine base (10) which is parallel to the mounting surface (10F) of the machine base (10) and orthogonal to the first direction (D11), and the rotating member (86) fixed to the stationary platen (20) and configured to be rotatable about the connecting pin (84), and the connecting pin (84) is disposed so as to include the plane (F1) that passes through the central axis of the nozzle (46) and that is parallel to the mounting surface (10F) of the machine base (10).

Thus, the inclination of the connecting member (18) can be suppressed as compared with a case where the connecting pin (84) is provided so as not to include the plane (F1) that passes through the central axis of the nozzle (46) and is parallel to the mounting surface (10F) of the machine base (10). Further, even if the connecting member (18) is inclined toward the stationary platen (20), the moment (MF) generated due to the inclination can be converted into rotation of the second connecting portion (80). As a result, the effect of preventing the stationary platen (20) from falling down by the connecting member (18) can be improved.

The injection molding machine (1) may further include the linear motion mechanism (70) provided on the machine base (10) and configured to enable the support base (62) to slide in the first direction (D11) or the second direction (D12) relative to the machine base (10), and the support base (62) may be supported by the machine base (10) via the linear motion mechanism (70). This makes it easy to stably slide the connecting member (18).

The rotating member (86) may be fixed to the stationary platen (20) at both sides of the connecting pin (84), one side of which is a machine base (10) side that is closer to the machine base (10) than the connecting pin (84) is and another side of which is opposite to the machine base (10) side. With this configuration, it is possible to effectively suppress the inclination of the connecting member (18) toward the stationary platen (20), compared to a case where the rotating member (86) is fixed to the stationary platen (20) at one side and the other side of the connecting pin (84) in the widthwise direction (D3) of the machine base (10).

The rotating member (86) may be fixed to the stationary platen (20) by a plurality of first fasteners (90), and the plurality of first fasteners (90) may be provided symmetrically with respect to the plane (F1) that passes through the central axis of the nozzle (46) and that is parallel to the mounting surface (10F) of the machine base (10). This makes it possible to suppress variations in the force acting on each of the plurality of first fasteners (90).

The second connecting portion (80) may be provided symmetrically with respect to the plane (F2) that passes through the central axis of the nozzle (46) and that is orthogonal to the mounting surface (10F) of the machine base (10). This makes it possible to strengthen the connecting between the stationary platen (20) and the connecting member (18) as compared with a case where only one second connecting portion (80) is provided, and further it is possible to suppress variations in the force acting on each of the second connecting portions (80).

The connecting pin (84) may be fixed so as to be non-rotatable relative to the arm portion (64) and non-slidable direction relative to the arm portion (64) in the pin axis (AX). Thus, the moment (MF) generated by the inclination of the connecting member (18) toward the stationary platen (20) can be more effectively converted into the rotation of the second connecting portion (80).

The injection molding machine (1) may further include at least two stationary platen support portions (100) provided on the machine base (10) and configured to support both sides of the stationary platen (20) in the widthwise direction (D3) of the machine base (10). Thus, compared to a case where the stationary platen support portion (100) is not provided, the inclination of the stationary platen (20) in the falling direction due to the connecting member (18) can be further suppressed.

The height (H) of each of the stationary platen support portions (100) from the mounting surface (10F) of the machine base (10) may exceed the level of the plane (F1) that passes through the central axis of the nozzle (46) and that is parallel to the mounting surface (10F) of the machine base (10). In comparison with a case where the height (H) does not exceed the level of the surface, it is possible to reliably and stably prevent the stationary platen (20) from falling down due to the connecting member (18).

The stationary platen (20) may be in non-contact with the machine base (10). Thus, even if the stationary platen (20) expands due to heat or the like conducted from the mold (26), it is possible to reduce asymmetric deformation of the stationary platen (20) on the machine base (10) side and the opposite side thereof. Therefore, even if the connecting member (18) is inclined toward the stationary platen (20), the moment (MF) is less likely to be generated in the direction in which the stationary platen (20) falls down. As a result, the effect of preventing the stationary platen (20) from falling down by the connecting member (18) can be further improved.

The stationary platen (20) and each stationary platen support portion (100) may be provided symmetrically with respect to the plane (F2) that passes through the central axis of the nozzle (46) and that is orthogonal to the mounting surface (10F) of the machine base (10). Accordingly, it is possible to suppress variations in the force generated at the contact portions between the stationary platen (20) and the stationary platen support portions (100), and it is possible to stably support the stationary platen (20) by each of the stationary platen support portions (100).

Each stationary platen support portion (100) may be fixed to the stationary platen (20) by the plurality of second fasteners (106), and the plurality of second fasteners (106) may be provided symmetrically with respect to the plane (F1) that passes through the central axis of the nozzle (46) and that is parallel to the mounting surface (10F) of the machine base (10). Accordingly, it is possible to suppress variation in force acting on each of the plurality of second fasteners (106).

The plurality of second fasteners (106) may be provided symmetrically with respect to the plane (F3) that passes through the thickness-direction center of the stationary platen (20) of the first direction (D11) and is orthogonal to the mounting surface (10F) of the machine base (10). Accordingly, it is possible to suppress variation in force acting on each of the plurality of second fasteners (106).

The invention claimed is:

1. An injection molding machine comprising:
    an injection unit including a nozzle configured to inject a molten material into a mold fixed to a stationary platen and a movable platen;
    a machine base on which the injection unit is mounted;
    a nozzle touch mechanism configured to press the nozzle against the mold by moving the injection unit relative to the machine base in a first direction of approaching the mold; and
    a connecting member configured to be slidable relative to the machine base in the first direction and a second direction opposite to the first direction and to connect the nozzle touch mechanism and the stationary platen, wherein
    the connecting member includes a support base configured to be slidably attached to the machine base and an arm portion rising upward from a portion of the support base that is positioned on a side of the stationary platen, the support base includes a first connecting portion to which the nozzle touch mechanism is connected, and an upper portion of the arm portion includes a second connecting portion to which the stationary platen is connected,
    the second connecting portion of the connecting member includes a connecting pin fixed to the arm portion and extending in a widthwise direction of the machine base which is parallel to a mounting surface of the machine base and orthogonal to the first direction, and a rotating member fixed to the stationary platen and configured to be rotatable about the connecting pin, and
    the connecting pin is disposed so as to include a plane that passes through a central axis of the nozzle and that is parallel to the mounting surface of the machine base.

2. The injection molding machine according to claim 1, further comprising a linear motion mechanism provided on the machine base and configured to allow the support base to slide relative to the machine base in the first direction or the second direction,
    wherein the support base is supported by the machine base via the linear motion mechanism.

3. The injection molding machine according to claim 1, wherein
    the rotating member is fixed to the stationary platen at both sides of the connecting pin, one side of which is a machine base side that is closer to the machine base than the connecting pin is and another side of which is opposite to the machine base side.

4. The injection molding machine according to claim 1, wherein
    the rotating member is fixed to the stationary platen by a plurality of first fasteners, and
    the plurality of first fasteners are provided symmetrically with respect to the plane that passes through the central axis of the nozzle and that is parallel to the mounting surface of the machine base.

5. The injection molding machine according to claim 1, wherein
    the second connecting portion is provided symmetrically with respect to a plane that passes through the central axis of the nozzle and that is orthogonal to the mounting surface of the machine base.

6. The injection molding machine according to claim 1, wherein
    the connecting pin is fixed so as to be non-rotatable relative to the arm portion and non-slidable relative to the arm portion in a pin axis direction.

7. The injection molding machine according to claim 1, further comprising at least two stationary platen support portions provided on the machine base and configured to support both sides of the stationary platen in the widthwise direction of the machine base.

8. The injection molding machine according to claim 7, wherein
    a height of each of the stationary platen support portions from the mounting surface of the machine base exceeds a level of the plane that passes through the central axis of the nozzle and that is parallel to the mounting surface of the machine base.

9. The injection molding machine according to claim 7, wherein
    the stationary platen is not in contact with the machine base.

10. The injection molding machine according to claim 7, wherein
    the stationary platen is provided symmetrically with respect to a plane that passes through the central axis of the nozzle and that is orthogonal to the mounting surface of the machine base, and the stationary platen support portions are provided symmetrically with respect to the plane that passes through the central axis of the nozzle and that is orthogonal to the mounting surface of the machine base.

11. The injection molding machine according to claim 7, wherein each of the stationary platen support portions is fixed to the stationary platen by a plurality of second fasteners, and the plurality of second fasteners are provided symmetrically with respect to the plane that passes through the central axis of the nozzle and that is parallel to the mounting surface of the machine base.

12. The injection molding machine according to claim 11, wherein the plurality of second fasteners are provided symmetrically with respect to a plane that passes through a thickness-direction center of the stationary platen in the first direction and that is orthogonal to the mounting surface of the machine base.

\* \* \* \* \*